United States Patent Office 2,721,777
Patented Oct. 25, 1955

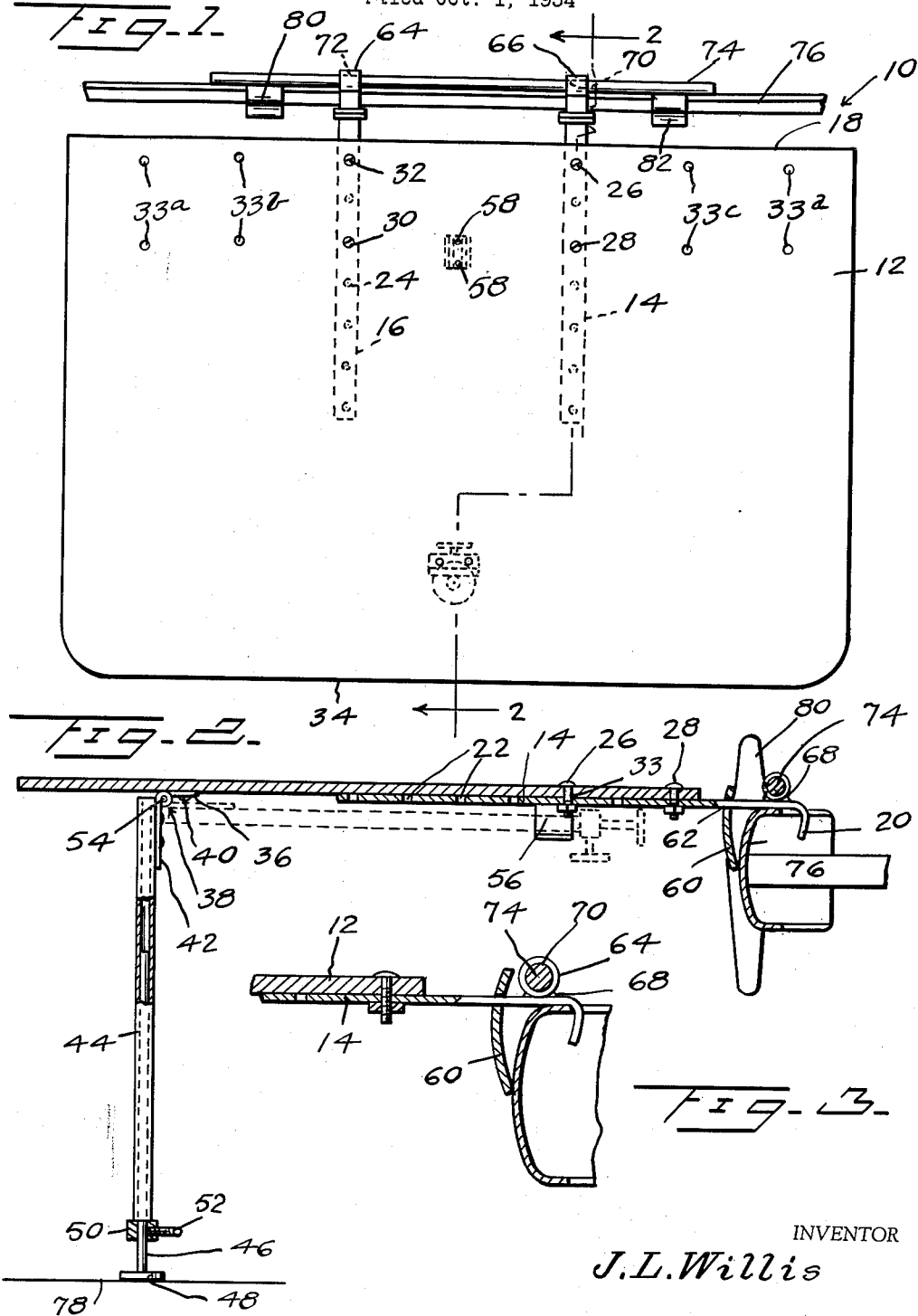

2,721,777

TABLE FOR ATTACHMENT TO AN AUTOMOBILE BUMPER

James L. Willis, Abilene, Tex.

Application October 1, 1954, Serial No. 459,622

2 Claims. (Cl. 311—21)

This invention relates to an accessory for automobiles and other automotive vehicles, and more specifically, this invention pertains to a picnic table which may be detachably supported from the bumper of an automobile.

One of the primary objects of this invention is to provide a table with clamping means for detachable connection to the bumper of an automobile and to prevent the inadvertent movement thereof toward and away from the bumper.

Another object of this invention is to provide a table having a side thereof adapted to be supported upon the bumper of a car, together with adjustable means for supporting the other side thereof.

A further object of this invention is to provide a picnic table of the type referred to above with means for detachably connecting the table with the bumper guards of an automobile bumper.

A still further object of this invention is to provide a picnic table with means for facilitating the manual handling thereof.

This invention also contemplates the provision of a picnic table as referred to above, the picnic table being inexpensive to manufacture, non-complex in construction and assembly, and durable in use.

Other and further objects of the instant invention will become more evident from a consideration of the following specification when read in conjunction with the annexed drawing, in which:

Figure 1 is a top plan view of a picnic table constructed in accordance with this invention, the view illustrating the support of one side of the table on the bumper of an automobile.

Figure 2 is a cross-sectional view taken on the line 2—2 of Figure 1, looking in the direction of the arrows.

Figure 3 is an enlarged detail cross-sectional view illustrating one mode of operation of a picnic table constructed according to this invention.

Referring now more specifically to the drawing, reference numeral 10 designates, in general, a table constructed in accordance with the teachings of this invention. The table 10 comprises an elongated, substantially rectangular table top 12, having secured to the under side and extending transversely thereof a pair of spaced, elongated, substantially rectangular metallic straps 14, 16, the outer ends of which project beyond the longitudinal side 18 of the table top 12, and terminate in downwardly turned end portions 20 to form a stationary jaw of a clamping mechanism.

As seen in Figures 1 and 2 of the drawing, each of the straps 14, 16 are provided with a plurality of axially spaced openings 22, 24, which are adapted to receive therethrough the bolts 26, 28 and 30, 32 which pass through suitable openings 33 in the top 12. This provides means for selectively adjusting the distance between the table side 18 and the jaw 20. The straps 14, 16 may be laterally adjusted by passing the bolts 26, 28 through additional openings 33a, 33b, 33c, and 33d.

Adjacent the other side 34 of the table top 12 one plate 36 of a hinge 38 is fixedly secured to the under side of the table top 12 by screws 40, and the other plate 42 of the hinge 38 is fixedly secured to one end of an elongated substantially hollow tubular member 44 having opposed open ends. The tubular member 44 is adapted to telescopically receive therein an elongated substantially cylindrical rod 46 having an enlarged circular flange 48 fixedly connected to the outer end thereof. A collar 50 provided with a set screw 52 is adjustably mounted on the rod 46 intermediate the flange 48 and the adjacent end of the tubular member 44.

As seen in Figure 2 of the drawing, the tubular member 44, together with the rod 46 and the collar 50, is adapted to be pivoted upwardly (counterclockwise) about the hinge pin 54, for engagement within an inverted, substantially U-shaped spring clamp 56, fixedly secured to the under side of the table top 12 as by screws 58.

A pair of elongated, arcuately shaped, adjustable clamping jaws 60 are provided, and each of said jaws is formed with a transversely extending aperture 62 which slidably receive therethrough that portion of the metallic straps 14, 16 disposed intermediate the jaw 20 and the adjacent edge 18 of the table.

Each of the straps 14, 16 carries an enlarged, substantially hollow circular boss 64, 66 adjacent its outer end, the bosses being secured to the upper side of their respective strap as by welding 68. The openings 70, 72 extending through the bosses 64, 66 are aligned and are adapted to slidably receive therethrough a cylindrical rod 74.

While it is believed that the above description and the annexed drawing clearly describe and illustrate the operation of this picnic table, its use will be described below.

Assuming that the tubular member 44 has been rotated into its dotted line position shown in Figure 2, and that the table is not connected with the bumper of an automobile, the user of the table may conveniently move the table 10 into position adjacent the front or rear bumper of the vehicle by grasping the rod 74 intermediate its ends. Thereafter, the jaws 20 are passed over the upper edge of the front or rear bumper 76 and engage against the inner side thereof while the outer ends of the straps 14, 16 bear against the upper end of the bumper. Thereafter, the adjustable jaw 60 of the clamping mechanism is brought into engagement with the outer side of the bumper 76 in the manner illustrated in the figures. The depending portion of the clamping jaws 60 will prevent the table 10 from shifting laterally inwardly toward the automotive vehicle, and the fixed jaw 20 which engages against the inner side of the bumper 76 effectively prevents movement of the table 10 away from the vehicle.

The tubular member 44 is then swung downwardly from its dotted line position, and the rod 46 is slidably withdrawn therefrom to engage the flange 48 against the ground 78, or other supporting surface. With this adjustment having been made, the collar 50 is moved into engagement with the adjacent end of the tubular member 44 and the set screw is tightened to fixedly secure the collar 50 in its adjusted position.

To disconnect the table 10 from the bumper 76, it is merely necessary to move the clamping jaw 60 laterally to the left, as viewed in Figure 2, out of engagement with the bumper 76. The table 10 is then lifted away from the bumper 76 and the tubular member 44 is pivoted to its dotted line position as shown in Figure 2. The collar 50 is then released from the rod 46 to permit the inward movement thereof relative to the tubular member 44.

In the embodiment of the invention described above, it is optional whether or not the rod 74 is disposed within the bosses 64, 66. In the event the rod 74 is used, the same will extend behind and engage against the bumper guards 80, 82 and acts as stop means to prevent movement of the table away from the vehicle.

If, for some reason, it is found impractical to use the cooperating jaws 20, 60 to secure the table to the bumper, the straps 14, 16 may be positioned on the top of the bumper 76 with the rod 74 positioned behind the bumper guards 80, 82. The adjustable jaws of the clamping mechanism are then moved into position against the outer side of the bumper 76 to effectively clamp and support the table 10 thereon.

While this accessory has been described as a picnic table, it is obvious that it may be used in other ways as, for example, a tool table, desk and other analogous manners.

Having described and illustrated this invention in detail, it will be understood that this embodiment is offered merely by way of example, and that the invention is to be limited only by the scope of the appended claims.

What is claimed is:

1. A table comprising an elongated table top having a substantially rectangular configuration, a pair of elongated, substantially rectangular, spaced and parallel straps secured to the under surface of said top and having one of their respective ends projecting from a side of said top, each of said straps terminating at their outer ends in a bent portion extending laterally away from said top and forming a stationary clamping jaw, an adjustable clamping jaw slidably mounted on said projecting ends of said straps and depending therefrom in confronting relation relative to said stationary jaw, a hinge plate fixedly secured to said under surface of said top, a hinge plate fixedly mounted on one end of an elongated tubular member, a hinge pin pivotally connecting said plates, an elongated cylindrical rod telescoped within said tubular member, said rod having an enlarged circular flange at its outer end, a collar mounted for axial adjustment on said rod intermediate said flange and the adjacent end of said tubular member, each of said straps having an enlarged hollow boss mounted thereon with the openings therein in alignment with each other, and a rod slidably mounted in said bosses and extending on opposite sides thereof.

2. A table comprising an elongated substantially rectangular table top, strap means connected to said table top and extending beyond a side thereof for clamping engagement with a vehicle bumper, an elongated tubular member having an open end, said tubular member having its other end pivotally connected to said top, a rod telescopically mounted in said tubular member, means securing said rod in selective adjusted position relative to said tubular member, means releasably securing said other end of said tubular member to said table top, and a rod detachably supported on said straps and extending transversely thereof.

References Cited in the file of this patent

UNITED STATES PATENTS

| 1,403,317 | Gross | Jan. 10, 1922 |
| 1,480,052 | Epley | Jan. 8, 1924 |
| 1,723,238 | Hoot | Aug. 6, 1929 |
| 1,885,615 | McGinley | Nov. 1, 1932 |
| 2,195,366 | Haigh | Mar. 26, 1940 |
| 2,584,557 | Cuthbertson | Feb. 5, 1952 |
| 2,601,177 | Smullen | June 17, 1952 |